(12) United States Patent
Willis

(10) Patent No.: US 7,806,628 B2
(45) Date of Patent: Oct. 5, 2010

(54) APPARATUS AND METHODS FOR LAYING OF ELONGATE ARTICLES FROM A VESSEL

(75) Inventor: Stewart Kenyon Willis, Aboyne (GB)

(73) Assignee: Acergy UK Limited, Bucksburn, Aberdeen (GB)

( * ) Notice: Subject to any disclaimer, the term of this patent is extended or adjusted under 35 U.S.C. 154(b) by 696 days.

(21) Appl. No.: 10/550,869

(22) PCT Filed: Mar. 23, 2004

(86) PCT No.: PCT/GB2004/001275

§ 371 (c)(1), (2), (4) Date: Aug. 9, 2006

(87) PCT Pub. No.: WO2004/085898

PCT Pub. Date: Oct. 7, 2004

(65) Prior Publication Data

US 2006/0275102 A1    Dec. 7, 2006

(30) Foreign Application Priority Data

Mar. 25, 2003   (GB) ................................ 0306784.0

(51) Int. Cl.
*F16L 1/12* (2006.01)

(52) U.S. Cl. ................ 405/166; 405/158; 405/169; 405/170; 166/360

(58) Field of Classification Search ................ 405/158, 405/166, 168.1, 169, 170; 114/244, 253, 114/254, 258; 166/355, 360, 378
See application file for complete search history.

(56) References Cited

U.S. PATENT DOCUMENTS 4,269,540 A    5/1981   Uyeda et al.
5,449,252 A    9/1995   Maloberti et al.
5,975,802 A    11/1999  Willis
6,213,686 B1   4/2001   Baugh
6,351,388 B1   3/2002   Seguin (Continued)

FOREIGN PATENT DOCUMENTS

EP    0717222 A1    6/1996

(Continued)

OTHER PUBLICATIONS

Torch Offshore Innovative Approach to Deepwater Flowline Installation, Jim Mermis and Vincent Lacarme, Torch Offshore, Inc., pp. 1-4.

*Primary Examiner*—David J Bagnell
*Assistant Examiner*—Sean D Andrish

(57) ABSTRACT

This invention relates to apparatus and methods for laying of elongate articles from a vessel. The vessel includes a tower (2), on which is supported tensioning means (20,21), straightening means (19), and a hold-off clamp (14). The hold-off clamp (14) is mounted independently of the tower on a trolley (13) which can be moved into and out of alignment with the laying axis of the tower while supporting the elongate article under laying tension. This enables the pipe string to be moved out of the line of the tower (2) for the fitting of equipment such as mid-line connectors and PLETs. Methods are disclosed for using the apparatus for fitting a connection to the elongate article being laid using cranes etc provided on the vessel to move the trolley (13) and hold the laid pipe string or connection.

13 Claims, 9 Drawing Sheets

U.S. PATENT DOCUMENTS

| | | |
|---|---|---|
| 6,352,388 B1 | 3/2002 | Seguin |
| 6,361,250 B1 | 3/2002 | de Varax |
| 6,371,694 B1 | 4/2002 | de Varax et al. |
| 6,733,208 B2 | 5/2004 | Stockstill |
| 2002/0074125 A1* | 6/2002 | Fikes et al. ................. 166/352 |
| 2003/0091395 A1 | 5/2003 | Stockstill |
| 2003/0147699 A1 | 8/2003 | Long et al. |

FOREIGN PATENT DOCUMENTS

| | | |
|---|---|---|
| WO | WO02/057675 A1 | 7/2002 |
| WO | WO03/004915 A1 | 1/2003 |

* cited by examiner

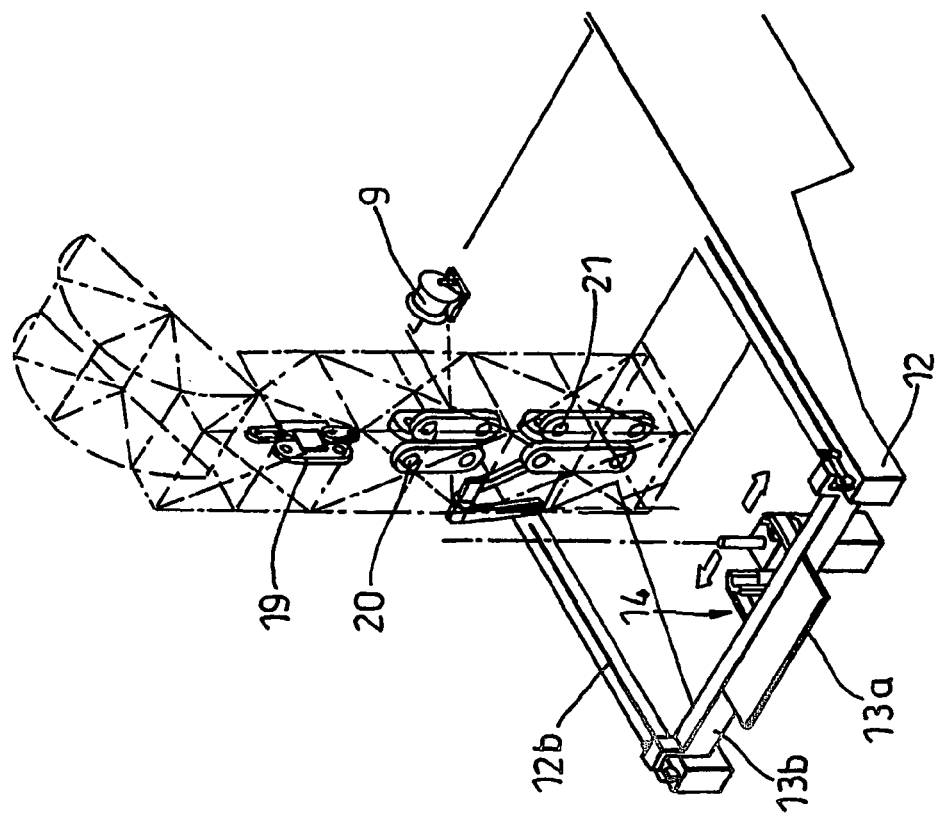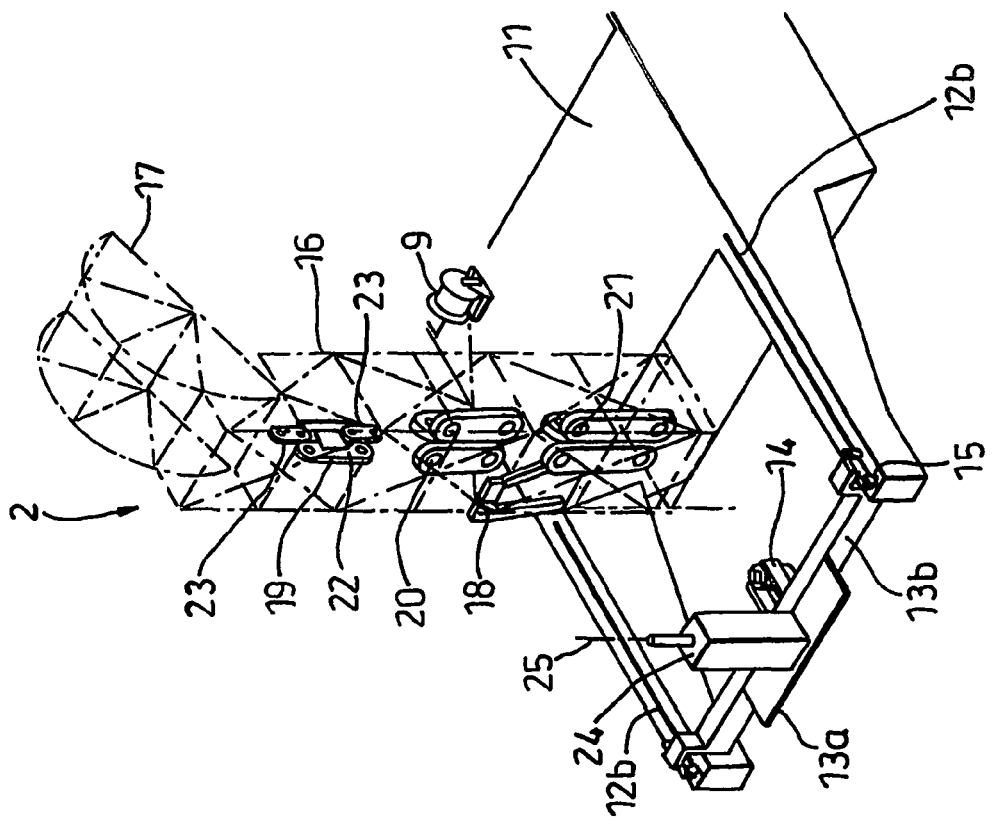

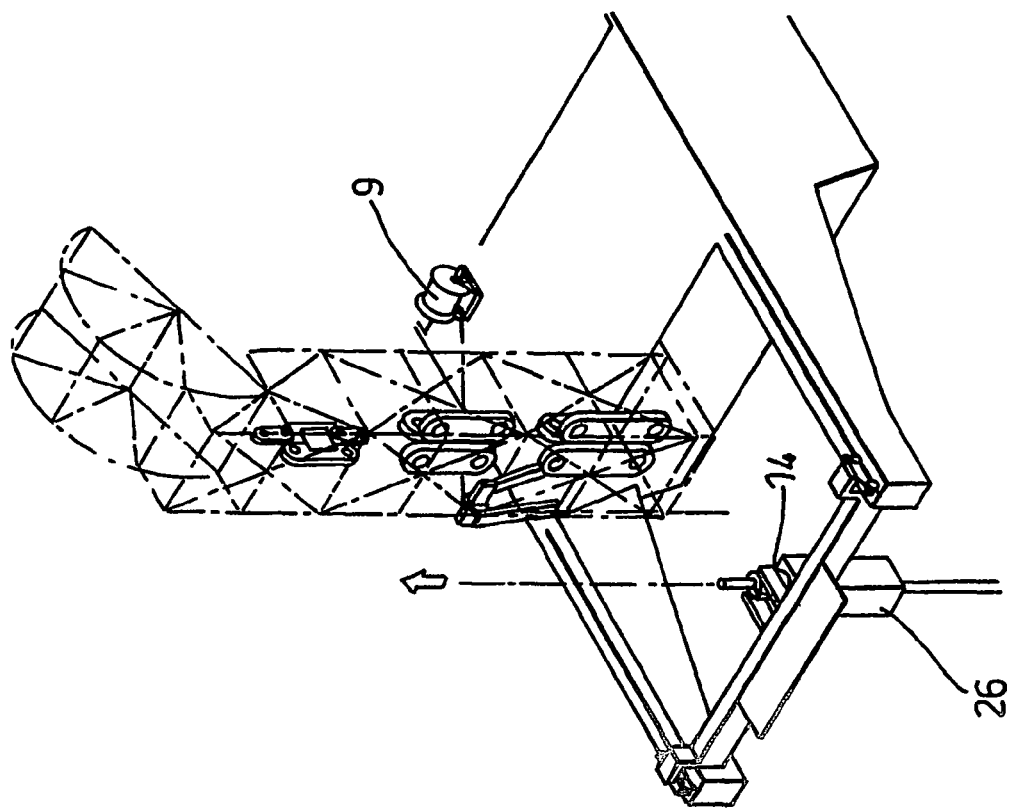
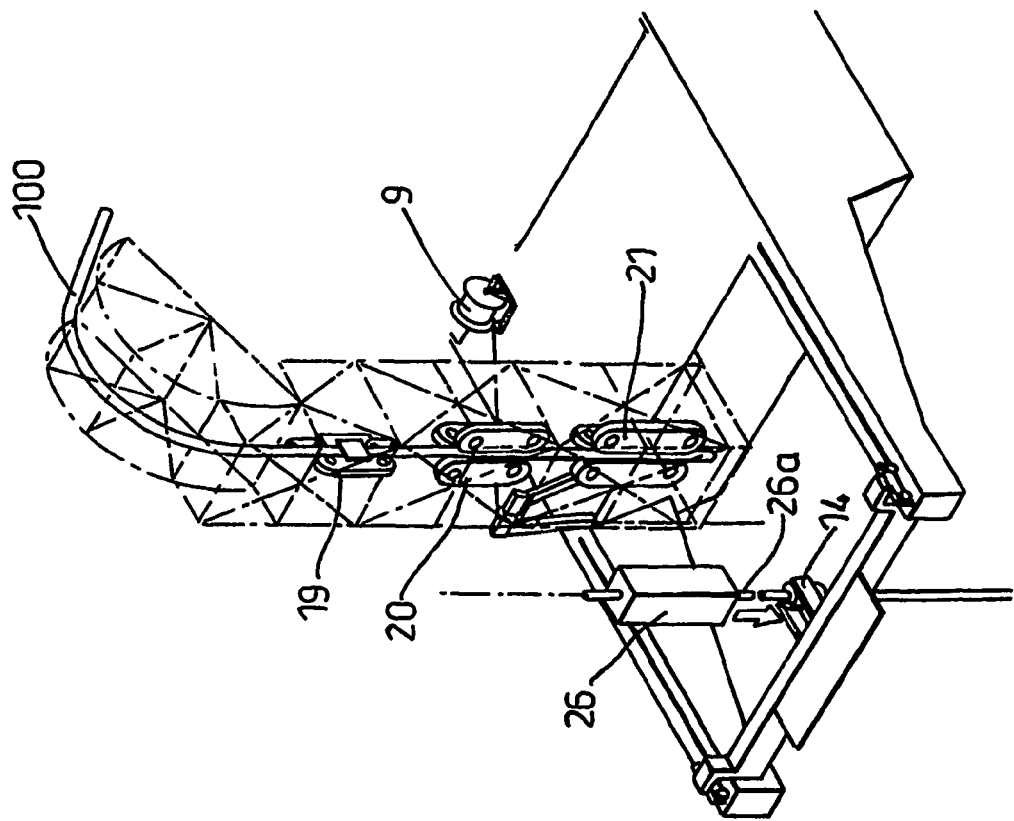

APPARATUS AND METHODS FOR LAYING OF ELONGATE ARTICLES FROM A VESSEL

INTRODUCTION

This invention relates to apparatus and method for use in the laying of elongate articles such as pipelines from a vessel at sea, and in particular where bulky connection modules are to be added to the pipeline or other article.

As the laying of pipes has progressed into deeper waters, and beyond the depths at which divers can work, it has become necessary to connect pipes using vertical stab-in connectors. The connector generally comprises a receptor attached to the pipeline and a stab-in part forming part of a closing spool. The receptors are normally housed in a protective structure, and as the depths have increased and the seabed become increasingly soft it has further become necessary to fit mud mats to the structures to stop them sinking into the seabed.

The protective structures have also been found to be useful for accommodating other pipe fittings as well as the vertical connectors, and they are therefore becoming very large and cumbersome. These end structures are generally referred to as Pipeline End Terminations (PLETs).

U.S. Pat. No. 5,975,802 (Willis/Stolt) describes apparatus for fabricating and laying pipelines in which sections of pipe are welded together on deck, bent upwards over the top of an inclined ramp, and then straightened and guided by the ramp into the sea. The receptor is attached to the end of the pipeline on the pipe laying vessel. This operation is performed in the pipelay ramp with the pipeline held from pipe tensioning means on the ramp when fitting to the start of the pipeline, or in a hold-off clamp when fitting to the end of a laid string. With a fitting to a completed pipeline the end of the pipeline is laid down onto the seabed by the Abandonment and Recovery (A&R) system. This typically comprises a wire rope reeved round suitable diverter sheaves to bring the wire into alignment with the centreline of the pipeline. A section of the pipeline is cut out to allow the pipeline to be correctly reeved.

Other vessels adapted for pipe laying operations are known for example from U.S. Pat. No. 6,361,250 (de Varax), U.S. Pat. No. 6,213,636 (Baugh), U.S. Pat. No. 6,371,694 (de Varax et al), and WO 03/004915 (Torch Offshore). WO 02/057675 and EP 0717222A (both Stolt) describe other examples specially adapted for laying flexible pipes through a moonpool.

It is necessary to provide sufficient space within the ramp to accommodate the PLET, including the mud mats, as well as the rigging for the connection of the A&R wire. This increases the height of the centre of gravity of the lay system and the effective centre of gravity of the pipe catenary, thereby reducing the vessel stability and therefore the payload that can be carried on deck. In addition, it is also very difficult to load new PLETs into the ramp because of restricted crane access.

The present invention is concerned with alleviating, or at least reducing the extent and effect of these problems.

In accordance with a first aspect of the present invention there is provided apparatus for use in the laying of elongate articles from a vessel, which apparatus includes a tower, tensioning means supported on the tower for paying out the elongate articles under laying tension and a hold-off clamp, wherein the hold-off clamp is mounted independently of the tower on a trolley which can be moved into and out of alignment with the laying axis of the tower while supporting the elongate article under laying tension.

The provision of the hold-off clamp on a trolley enables the hold-off clamp to be moved clear while holding the weight of the pipeline being laid and thereby allow greater working space for working on an elongate article held in the hold-off ramp. In turn this enables the tower equipment to have its centre of gravity located nearer to deck level.

It is noted that U.S. Pat. No. 6,352,388 (Seguin) proposes a hang-off clamp skiddable over a moonpool, but this skidding operation is not said to be useful for carrying the suspended pipeline into and out of the laying axis. Rather, the present applicant assumes that the skidding can only be done where there is no suspended load.

The trolley may comprise at least one beam which is capable of running on rails and which spans the laying axis. The rails may be provided on booms which extend outboard from the deck, or may be either side of a moonpool.

In one particular example of the invention the trolley comprises a beam which extends between two rails, one rail provided on each of two booms/outriggers which booms/outriggers extend in parallel relationship and are spaced either side of the laying axis, with a working space between them.

The beam may be provided with a platform or work area.

The hold-off clamp may be moveable in two dimensions toward and away from the laying axis. The clamp may in particular be operable to one side of the lay axis (i.e. to port and/or starboard), as well as forward or aft of the lay axis.

The hold-off clamp may be mounted on the beam of the trolley. The hold-off clamp may be mounted on the beam so that it is moveable and operable at various positions along the length of the beam.

In this manner the apparatus is provided with a freedom of movement which enables the hold-off clamp to be positioned within the space defined by the stern of the vessel and the two booms/outriggers.

The invention is not limited to any particular form of tower. The apparatus may be used with any suitable type of tower, such as a fixed tower or ramp or inclinable tiltable tower, or gimballed or moveable tower. Therefore the invention may be used for handling of rigid or flexible lines as well as wire rope and synthetic rope used during deployment.

The tensioning means may be track tensioners, and in one example of the invention two banks of tensioners are provided. Alternatively, a clamp moveable along the tower may be provided, or a plurality of moveable clamps, moveable in sequence.

A radius controller may be located at an upper end of the tower for supporting a continuous elongate article being diverted into said tensioning means.

The tower may further include a straightener mounted on the tower between said radius controller and said tensioning means for receiving relatively rigid pipe from said radius controller in a bent condition, and for straightening said pipe.

The tensioning means may be arranged to take substantially the entire tension in the article being laid, for example as in U.S. Pat. No. 5,975,802 (vessel Seaway Falcon). This avoids the lay tension being carried through the straighteners, radius controller, etc, reducing strain on the pipe and lightening the elevated part of the structure. Alternatively, a substantial part of the lay tension may be carried over the radius controller, as for example in the well-known reel-lay vessel Apache, U.S. Pat. No. 4,269,540.

The straightener may include track type devices.

The vessel may also include Abandonment and Recovery (A&R) equipment such as a crane and this A&R crane may be used in the positioning of the connections to be gripped by the hold off clamp. A wire and winch may also be provided for drawing the article through the radius controller and tensioning means to meet the connection.

The invention further provides a method of laying an elongate article from a vessel which includes a tower having tensioning means supported on the tower for paying out said elongate article under tension, and a hold-off clamp mounted on a trolley at the foot of the tower for movement in and out of the laying axis of the ramp or tower; the method including fitting a connection module to the elongate article being laid by:

(a) positioning the hold-off clamp out of alignment with the laying axis of the ramp or tower;
(b) locating and securing a connection in the hold-off clamp so that at least a connecting piece of the connection extends above the hold-off clamp;
(c) positioning the hold-off clamp and connection in line with the laying axis of the tower;
(d) fixing the connection to the elongate article being laid; and
(e) disengaging the hold-off clamp such that the weight of the connection module is supported by the elongate article.

This method is suited for attachment of connections at the front end of an elongate article which is just beginning to be laid, for example attachment of the front end PLET in the case of pipeline laying.

The invention further provides a method of laying an elongate article from a vessel which includes a tower having tensioning means supported on the tower for paying out said elongate article, and a hold-off clamp mounted on a trolley at the foot of the tower for movement in and out of the laying axis of the tower, the method including fitting a connection to the elongate article being laid by:

(a) positioning the hold-off clamp and securing it about the elongate article being laid, the elongate article ending (or being cut) at a position above the hold-off clamp so that the hold-off clamp supports the load of laid elongate article;
(b) moving the hold-off clamp supporting the article out of alignment with the laying axis of the ramp or tower,
(c) positioning a connection module above the hold-off clamp;
(d) fixing the connection module to the end of the elongate article; and
(e) supporting the laid article and disengaging the hold-off clamp.

This method is suited for use in the fixing of connections such as mid-line connections or PLETs to the tail end of a catenary which has been substantially laid.

The vessel may also include Abandonment and Recovery (A&R) equipment such as a crane and this A&R crane may be used in the positioning of the connections to be gripped by the hold-off clamp.

Where the connection fitted to the elongate article is a tail end fitting the method may include the further step of deploying the end of the elongate article to the seabed. This deployment may be carried using the A&R equipment, for example the A&R crane and/or A&R winch.

Where the connection fitted to the elongate article is a mid-line connection the method may include the further steps of:

(f) positioning the connection module in the hold-off clamp so that at least a connecting piece extends above the hold-off clamp;
(g) moving the hold-off clamp under the ramp so that it is in line with the laying axis of the tower;
(h) fixing the connecting piece to the elongate article suspended in the tower; and
(i) disengaging the hold-off clamp while paying out the elongate article via said tensioning means.

These and other features and advantages of the invention will be appreciated from a consideration of the examples described below.

BRIEF DESCRIPTION OF THE DRAWINGS

Embodiments of the invention will now be described, by way of example only, by reference to the accompanying drawings, in which:

FIG. 1b is a plan view of the stern section of the vessel shown in FIG. 1a;

FIGS. 2 to 6 show the steps in mounting a front end Pipeline End termination to a pipeline using the vessel shown in FIG. 1;

FIGS. 11 to 16 show the steps in mounting a completion end Pipeline End termination to a pipeline using the vessel shown in FIG. 1.

DETAILED DESCRIPTION OF THE EMBODIMENTS

Figure 1A:
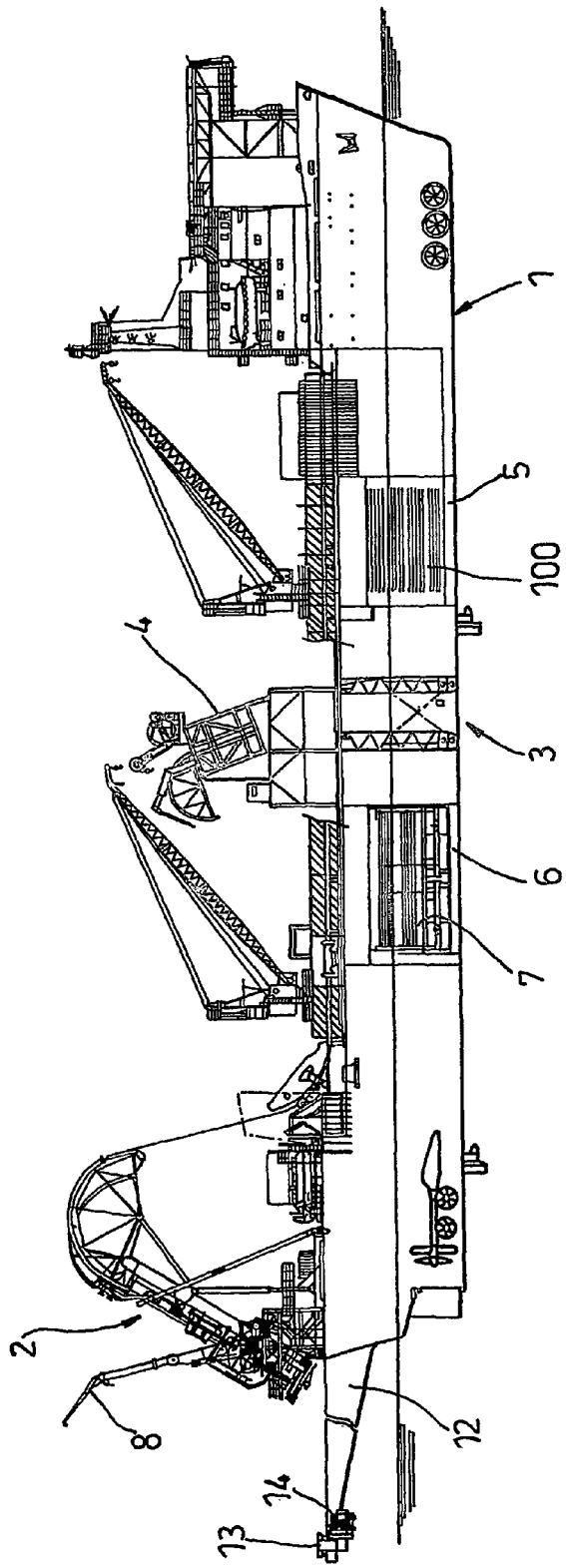
FIG. 1a is a side view, part cut away, of a vessel suitable for the laying of elongate articles subsea and having a stern ramp adapted for use in accordance with the present invention.
Figure 1B:
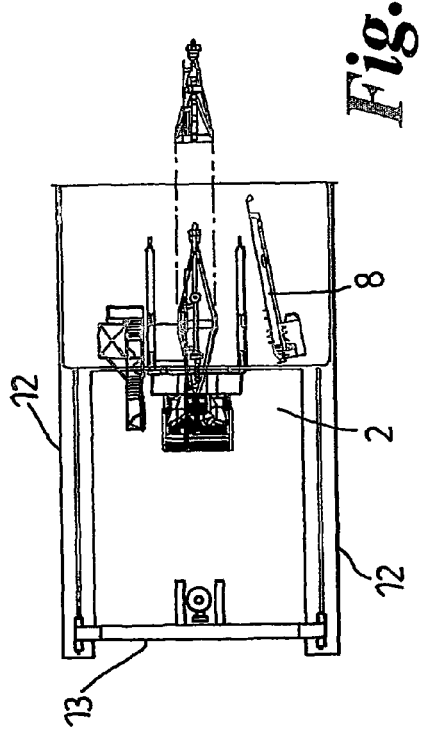

FIG. 1a and FIG. 1b show a pipe laying vessel 1 having a stern-mounted pipe laying ramp 2, a moonpool 3 with pipe laying tower 4, a hold 5 for the storage of lengths of pipe 100, and a hold 6 for the storage of a drum 7 of pipe or other elongate article. FIG. 1a shows the ramp 2 in an inclined position, while plan view FIG. 1b shows the ramp 2 in both positions, one position being fully vertical, the movement to the inclined position of the ramp 2 as shown in FIG. 1a being indicated by the dotted lines. Two outriggers 12 extend from the stern of the vessel 1. A trolley 13 is arranged to run fore and aft on rails along the outriggers, and carries a lock-off clamp 14 movable under load from port to starboard. FIG. 1a shows the near most outrigger cut away in order to give an uninterrupted view of the trolley 13 and lock-off clamp 14. These parts will be described in more detail with reference to FIG. 2.

The ramp 2 is provided with an abandonment and recovery (A&R) system including a crane 8 and an A&R winch 9.

The term "tower" as used in the introduction and appended claims is intended to encompass any tall structure used in the laying of a pipe line and therefore both the ramp 2 and the tower 4 shown in the drawings as well as other tall structures arranged to support elongate articles during laying operations. While the trolley 13 and clamp 14 are illustrated associated with the stern ramp 2 in this example, such an arrangement can also be envisaged being associated with the tower 4 and moonpool 3.

FIG. 2 of the drawings in schematic detail the stern of the vessel. Ramp 2 (shown in broken lines for clarity of the other elements) is mounted on the deck 11 of the vessel 1 so that it overhangs the stern of the vessel as seen in FIG. 1a and 1b. Located on either side of the ramp 2 and extending in parallel relationship extending from the stern of the vessel in this example are the two outriggers 12 carrying rails 12b. Extending between the rails 12b and mounted thereon is a trolley 13.

The trolley 13 comprises primarily a beam 13b on which is located a working platform 13a and a lock-off clamp 14. The trolley 13 is provided at each end of the beam 13b with a running wheel arrangement 15 to ease the movement of the trolley 13 under load on the rails 12b.

The lock-off clamp 14 is mounted on or in the beam 13b on a carriage and rails and is moveable and operable along a substantial part of the length of the beam. Therefore, the movement of the clamp 14 on the beam and the beam on the rails/outriggers means that in the plane below the base of the tower or ramp defined as above there is a high degree of freedom of movement and no point which cannot be reached by an operable clamp. Moreover, such movement can be commanded whether the clamp 14 is suffering a load or not.

The ramp 2 is shown only schematically in FIG. 2 but generally includes a framework having a main section 16 extending upwardly from the deck 11 and on which is located a radius controller 17. The framework and the equipment located therein are shaped and arranged so that an open side is provided. In the particular example illustrated the side opposite the deck is formed like an open channel. Therefore, passage is defined around the radius controller 17 and through the framework.

An A&R sheave arrangement 18 is located on the side of the ramp 2. This sheave enables A&R activity without the need to engage the A&R crane 8 and comprises a pulley type arrangement about which the winch 9 line is located for the transmission of the load from the winch.

Located and positioned within the framework of the ramp 2 are a straightener 19 and two tensioners 20, 21.

The straightener 19 comprises in this example an arrangement of three tracks: a main track 22 and two smaller track devices 23. The main track 22 is arranged in opposition to the two small devices 23 with the two smaller devices being located one above and one below the main track, and on the opposite side of the pipe axis. By driving the main track 22 against the pipe between the smaller devices 23, the pipe which is received bent from the radius controller 17 is straightened by plastic deformation.

Each of the tensioners includes banks of driven tracks, each bank having tracks spaced around the axis of the pipe or other elongate article so that the forces exerted by the tensioner, each bank of tracks when the article being laid is engaged are balanced. Tensioners having banks of two, three or four tracks are equally usable with this invention. One or more clamps movable on carriages up and down the tower may also be envisaged as an alternative form of tensioning means.

When the tensioners are not engaged with the article being laid there is sufficient space for the elongate article and certain wider accessories to be moved and passed through the tensioner. This enables work to be carried out. Each tensioner 20, 21 can be opened in turn to allow the controlled passage of such accessories. There is not clearance for larger accessories, however and these are handled using the trolley 13 and lock-off clamp 14 as will now be.

The general operation and arrangement of the tensioners and the straightener(s) is well known in the industry and further detail concerning their operation will not be given here FIGS. 2 to 6 of the drawings provide a step-by-step illustration of the method of initiating laying an elongate article, starting with a termination module. For the purposes of this example, the elongate article is a steel pipe being laid subsea and during the laying follows a catenary curve as it hangs from the stern of the vessel to the seabed. The depth may be well in excess of 1000 m, and the suspended weight therefore very large.

Figure 5:
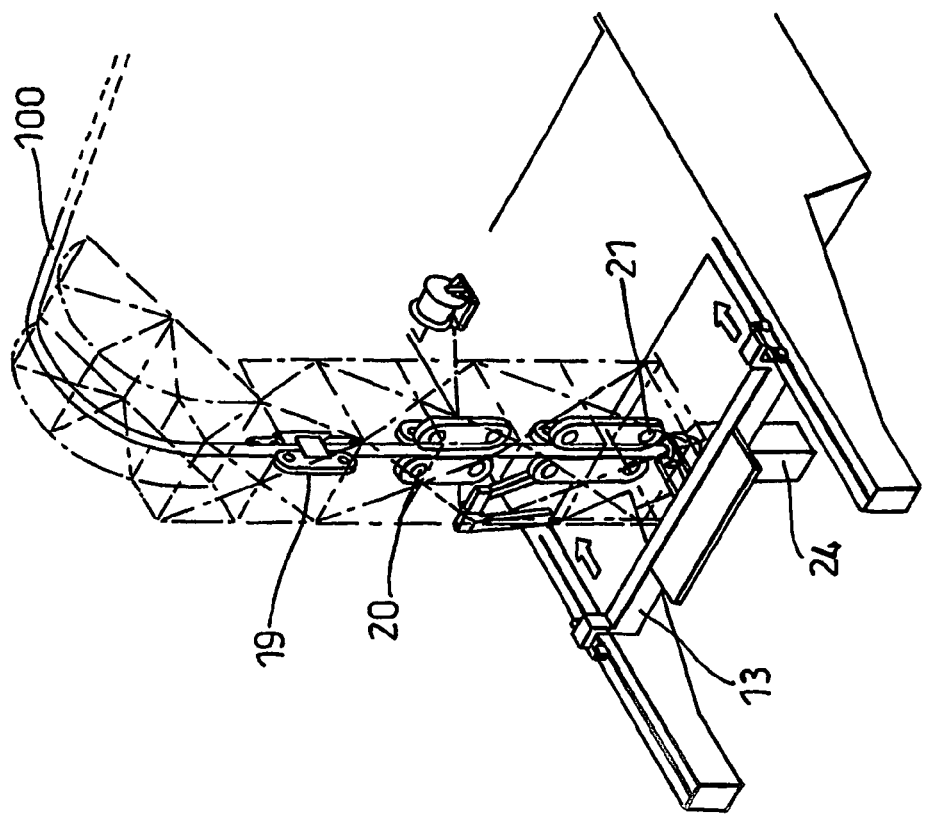
Figure 4:
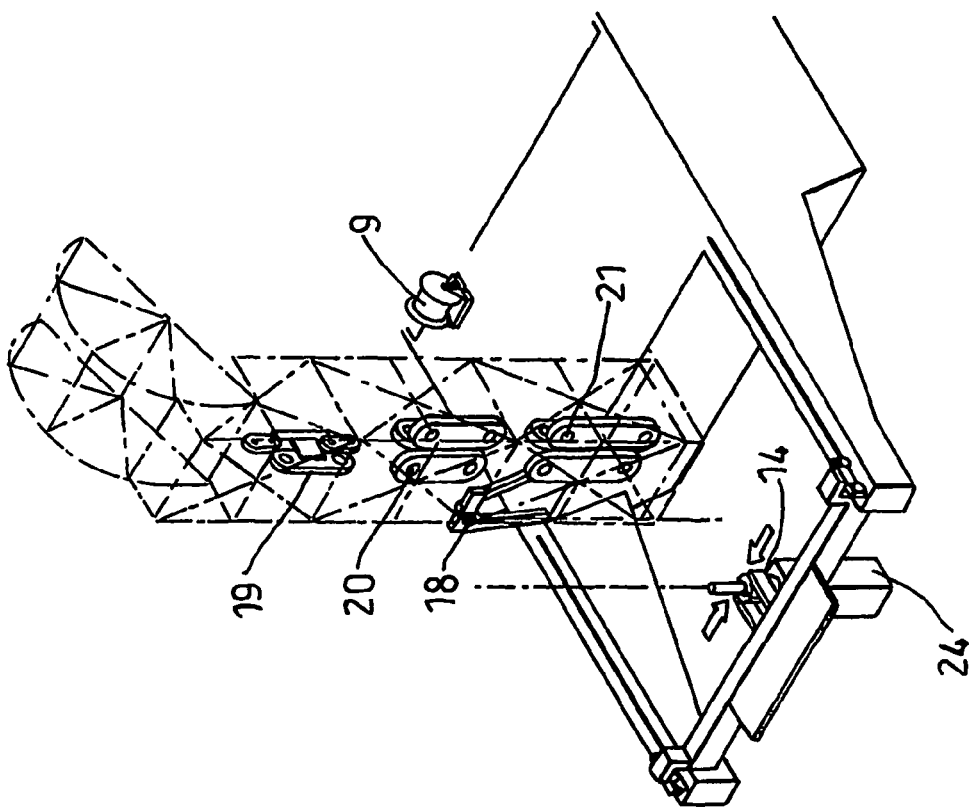

FIG. 2 shows the ramp 2 ready for the laying of a pipe 100 (FIG. 5). The trolley 13 initially is remotely located with regard to ramp 2 at the outboard end of the rails 12b, furthest from the tower. A Pipeline End Termination module (PLET) 24 having a stub pipe section is located on the platform 13a of the trolley 13 and suspended by line 25 from the A&R crane 8 (not shown in FIGS. 2-6).

Then, as shown in FIG. 3, PLET 24 is lifted by crane 8 and lowered into the space defined by the outriggers 12, and between the ramp 2 and the trolley 13. The lock-off clamp 14 is opened. The PLET is moved into position so that the stub pipe section 24a is located within the lock-off clamp 14. The lock-off clamp is now closed and the stub pipe section gripped in the clamp so that a portion thereof projects from the clamp (see FIG. 4).

Then, as shown in FIG. 5, pipe 100 to be laid is fed through radius controller 17, straightener 19 and tensioner 20, 21 until its end is level with the top of the stub pipe section 24a.

The trolley 13 is moved on the rails 12 to locate the PLET 24 the end of the pipe string being laid. The stub pipe section 24a and the end of the pipe 100 in the ramp 2 are properly located to one another and then welded to one another.

Figure 6:
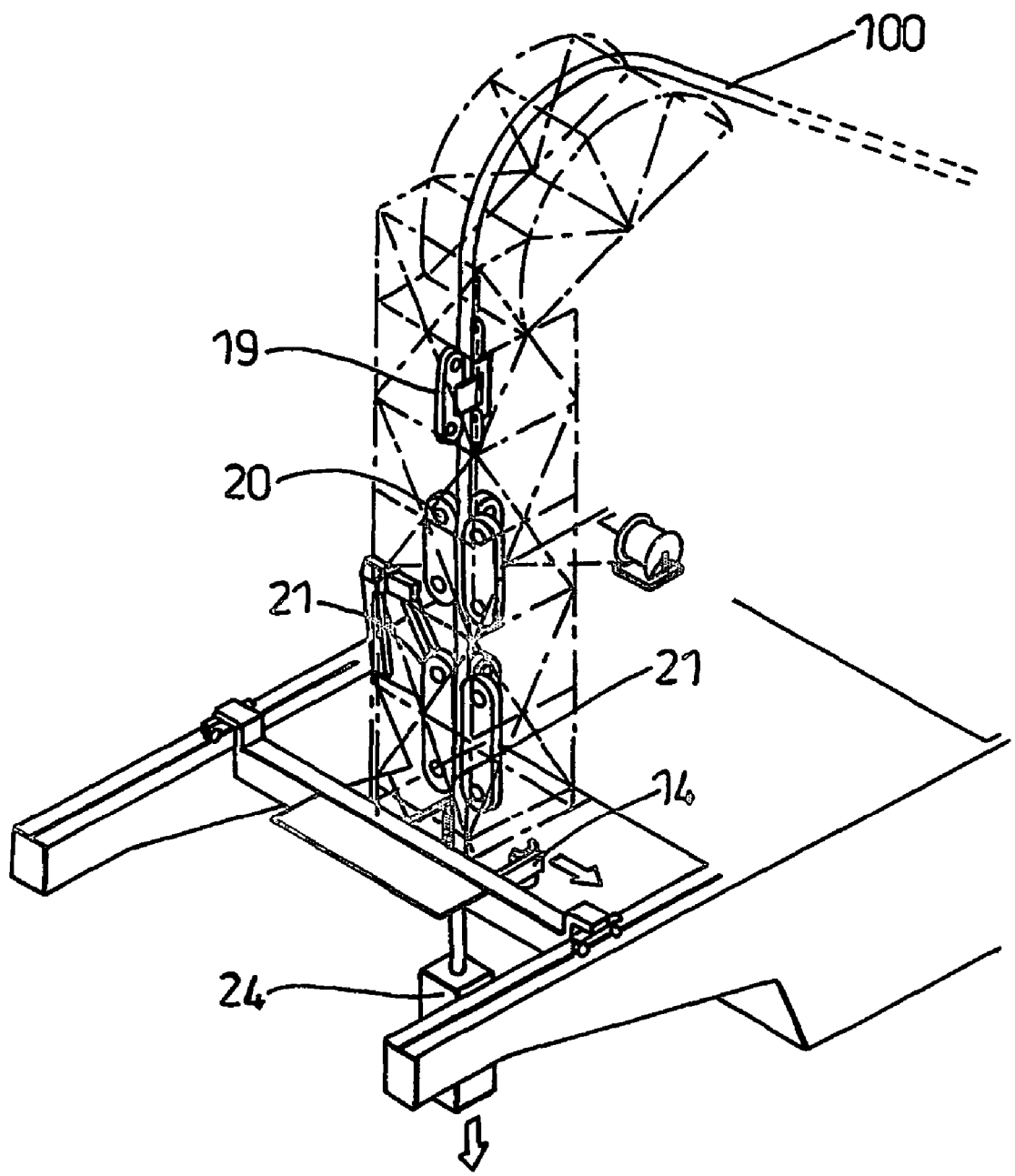

FIG. 6 shows how, with the PLET 24 connected to the pipe string 100, the lock-off clamp 14 is released and the tensioners 20, 21 in the ramp 2 engaged. The pipe can be laid from the vessel using the standard procedures known in the industry and for example as illustrated in the patents and applications mentioned in the introduction.

FIGS. 7 to 10 show a method by which a mid line connection M could be fixed into a pipeline as the pipe is being laid from the vessel 1. In this method, once the pipe has been paid out to the appropriate amount, the pipe is secured in the lock-off clamp 14. The pipe is then cut above the lock-off clamp 14 so that a stub of pipe is present.

Figure 8:
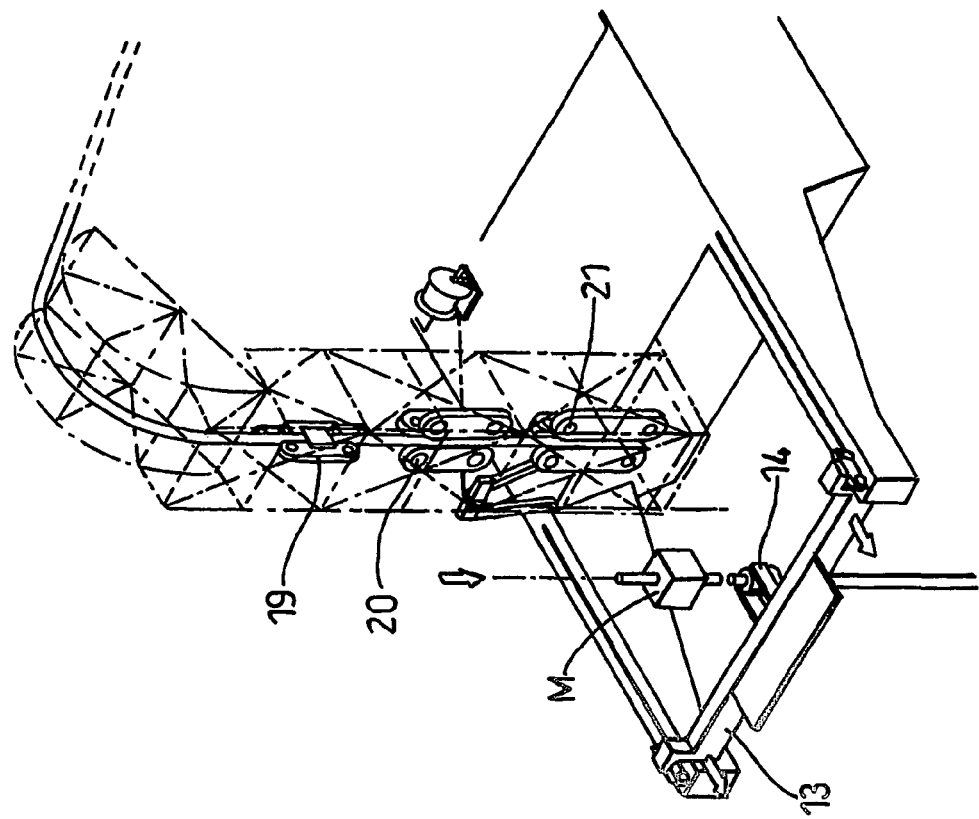
FIGS. 7 to 10 show the steps in fixing a mid-line connection into a pipeline being laid by a vessel as shown in FIG. 1.
Figure 7:
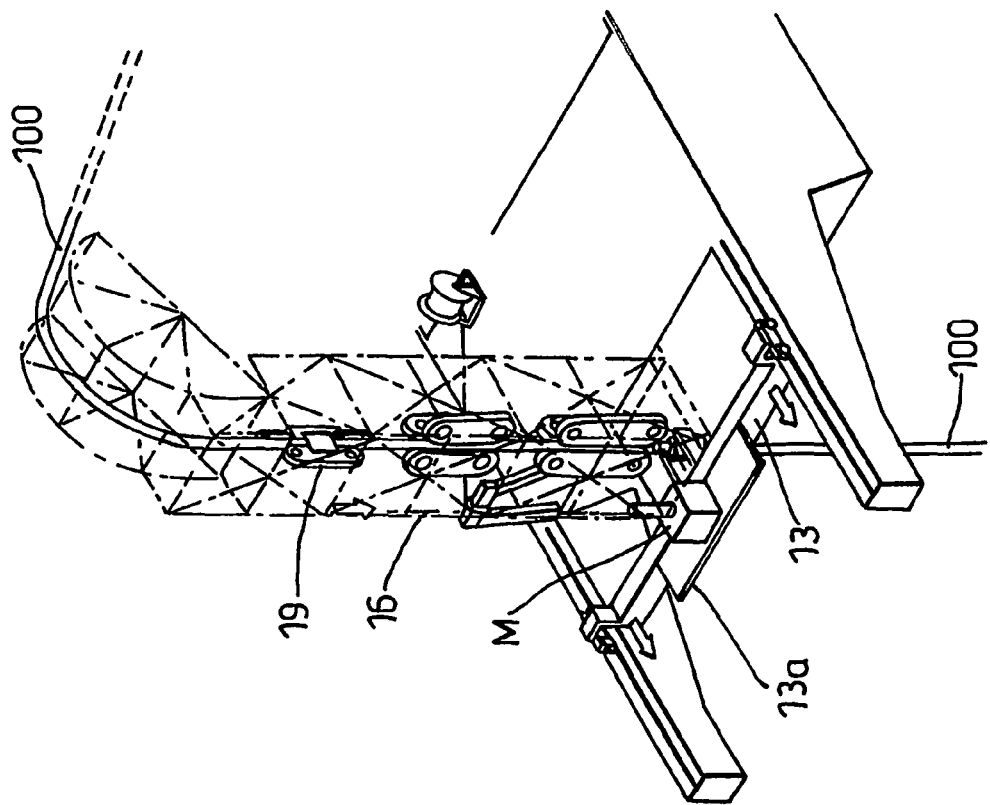

Once the pipe has been cut the trolley 13 is moved to a location remote from the ramp 2 so that there is space available for the pipeline to be worked on (FIG. 8).

A mid-line connection M having stub pipe sections, top and bottom, is lowered into position using the A&R crane 8 so that one of the stub pipe sections can be welded to the end of the cut pipeline held by the lock-off clamp 14.

Figure 10:
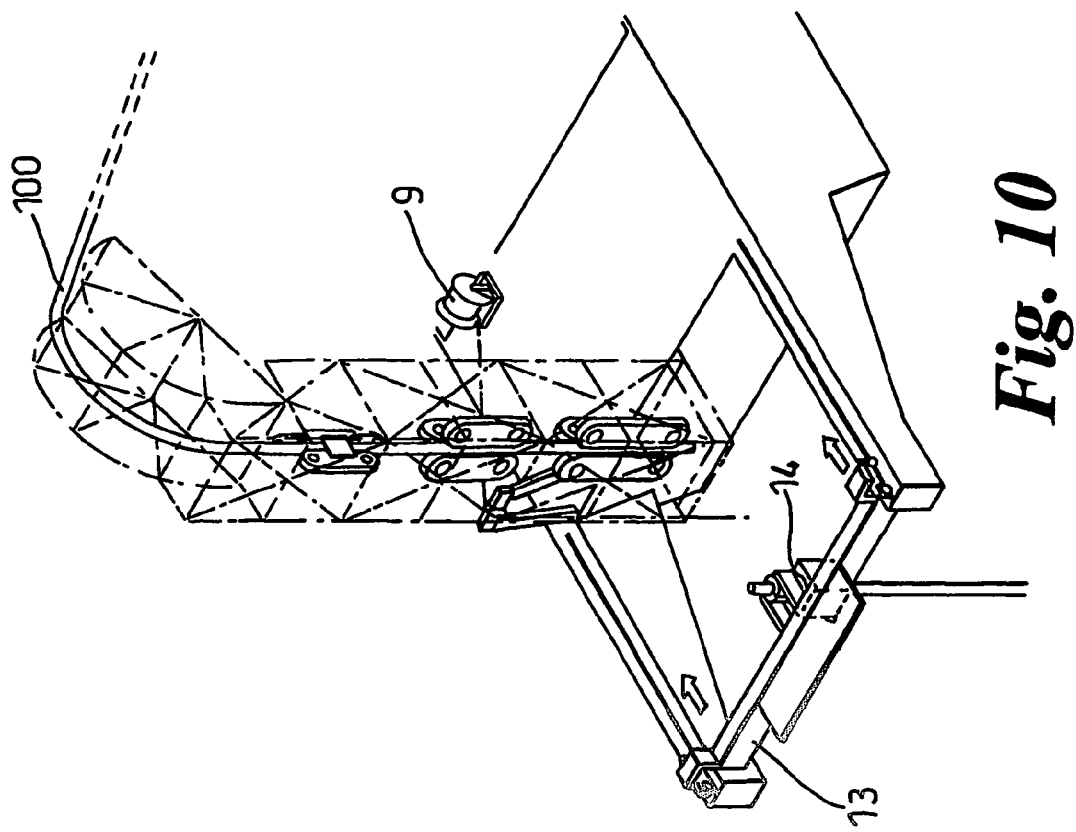
Figure 9:
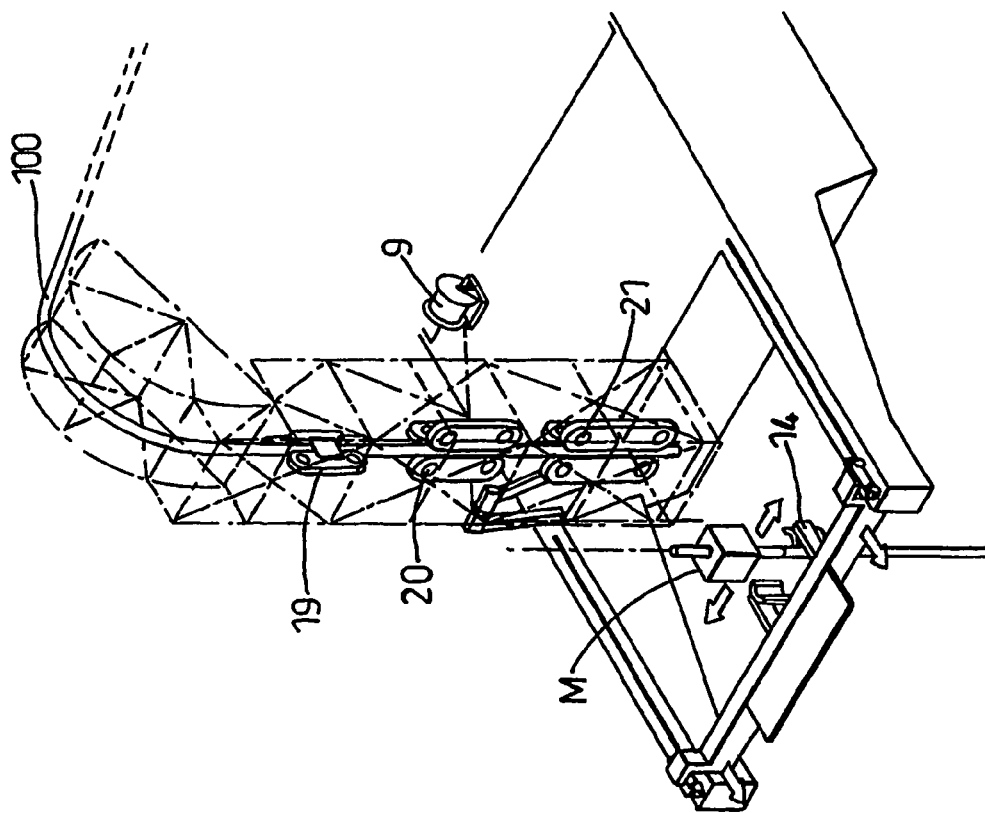

When the connection has been made the load of the pipeline with the mid-line connection M is taken by the A&R crane 8 and the lock off clamp 14 released (FIG. 9). The pipeline is lowered a short distance by the crane 8, and the lock-off clamp re-engaged so that it holds the pipeline via the other stub pipe section on the mid-line connection M (FIG. 10).

Figure 11:
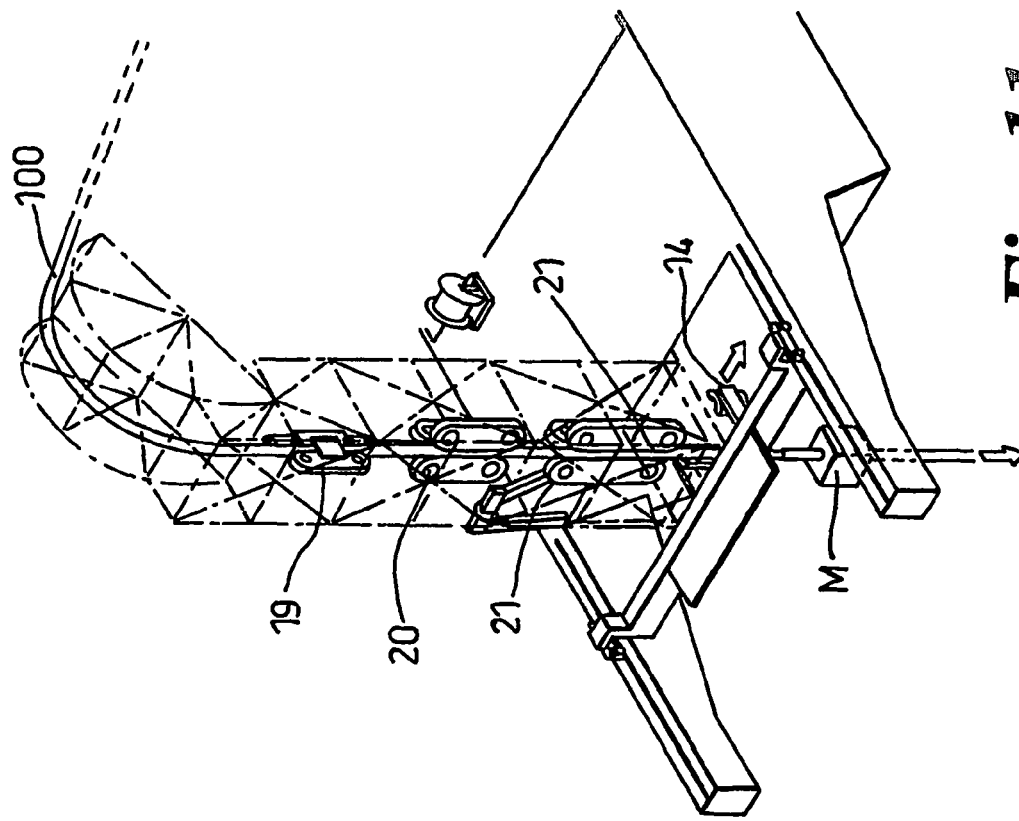
Figure 16:
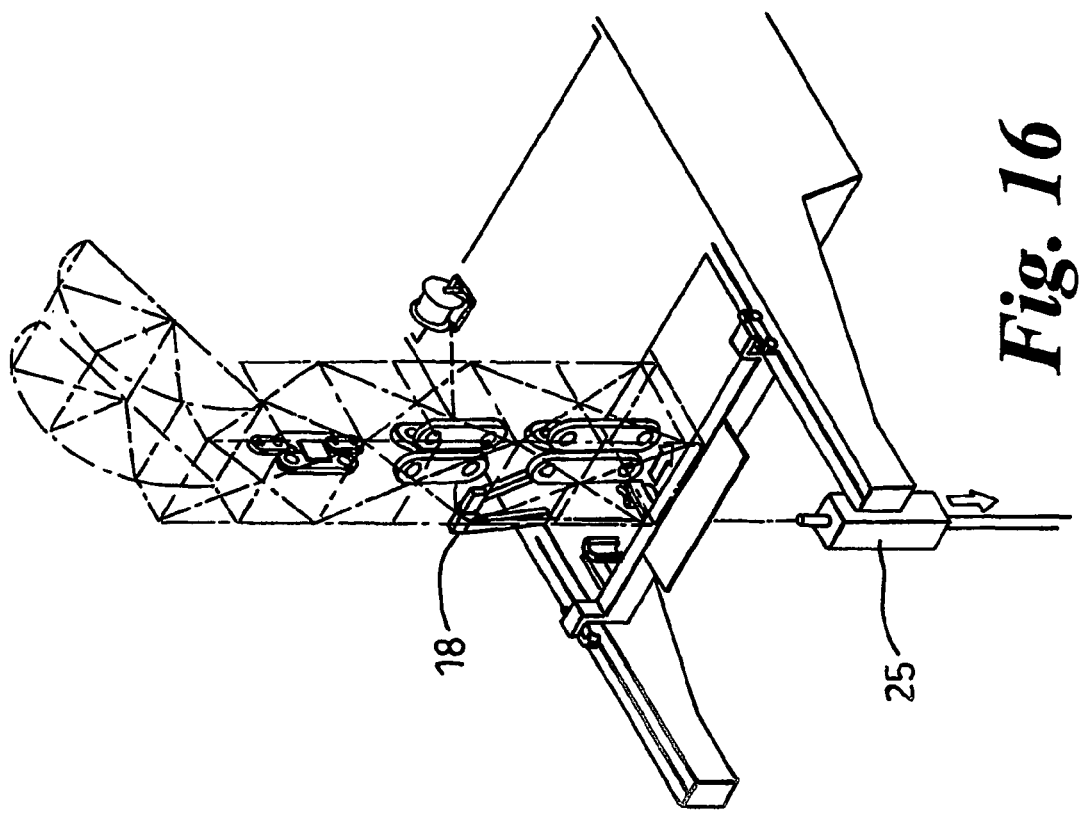

The trolley 13 is then moved into position below the pipe in the tower. As with the connection of the PLET 24 described above, the stub pipe section of the midline connection M is located to the pipeline. Once in position the pipeline is welded to the stub pipe section of the midline connection. When completed the lock-off clamp 14 is disengaged and the pipeline is paid out in the standard manner as mentioned above (FIG. 11).

FIGS. 12 to 16 of the drawings illustrate the procedure when the laying of the pipe is complete and end termination needs to be fitted to the end of the pipeline.

Figure 12:
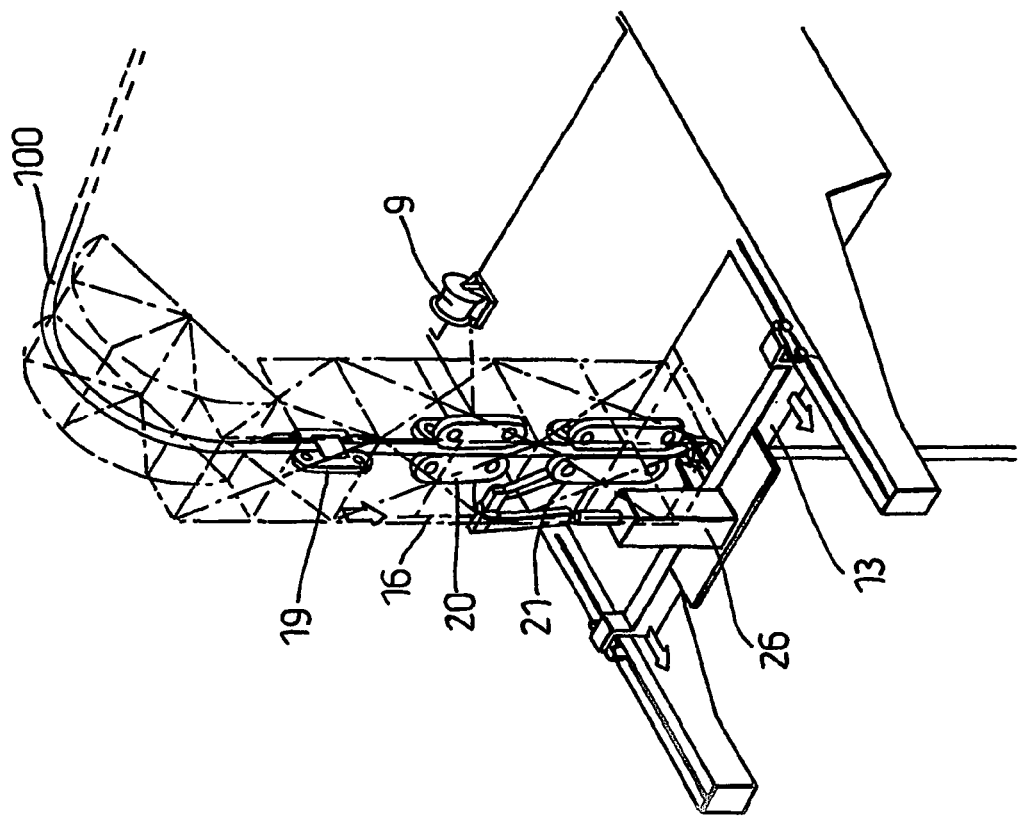

In order to do this, lock-off clamp 14 is engaged, taking the load of the pipe (FIG. 12). The pipe is then cut above the lock-off clamp 14 and the trolley 13 moved on the rails 12 to provide enough room to enable the pipeline to be worked on. A PLET 26 having a stub pipe section 26a is lowered using the crane 8 so the stub pipe section can be welded to the pipe held in the lock-off clamp 14 (FIG. 13). The PLET 26 is welded to the pipe.

When the PLET 26 has been welded to the pipeline the A&R crane 8 used to take the load of the pipeline and the lock-off clamp 14 released. The pipeline is lowered and the lock off clamp 14 engaged to means provide on the PLET (FIG. 14). The A&R crane is now disengaged from the pipeline.

Figure 15:
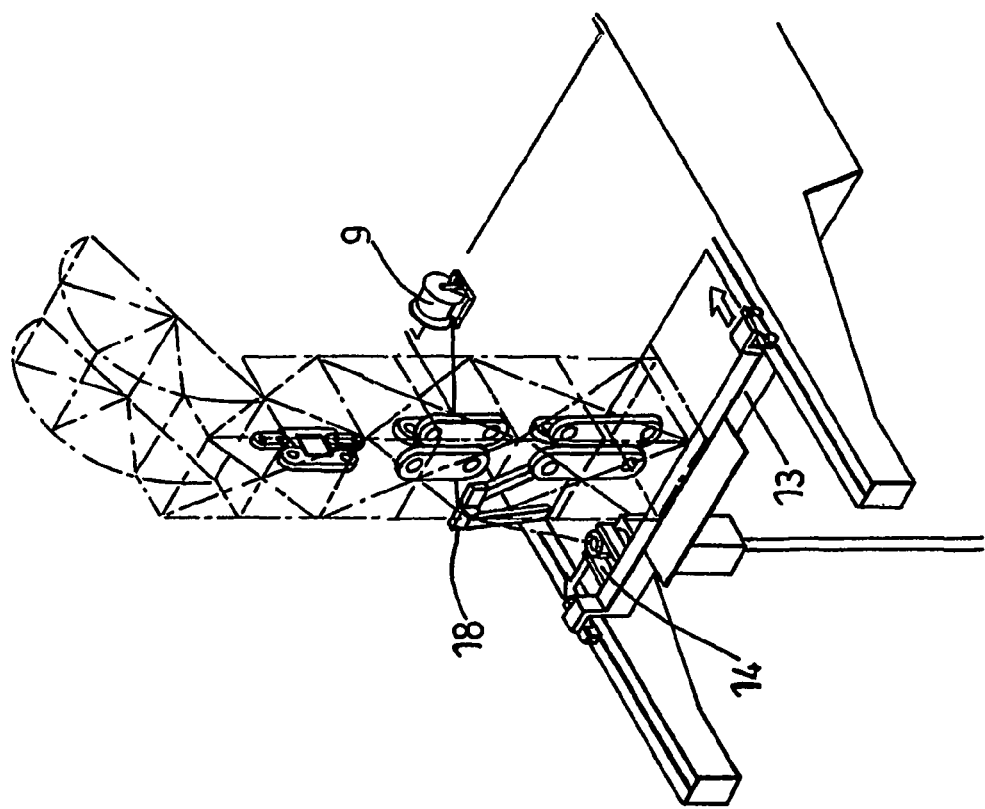

Using the trolley 13 the lock-off clamp 14, and the pipeline it is carrying, is moved forwards and to one side (port) of the ramp 2. The line from the A&R winch 9 is now attached to the PLET 26 via the sheave arrangement 18 (FIG. 15). The winch 9 can then be used to deploy the end of the pipeline and PLET 26 to the seabed (FIG. 16), or to a supporting surface structure such as a production platform or vessel.

The invention is not limited to towers of any particular type nor to location on a vessel, nor to any type of tensioning and clamping apparatus that may be provided. The apparatus may be specific to laying rigid pipe or flexible pipe, or may be adaptable to both.

It will further be appreciated that the trolley 13 could be provided in association with moonpool 3 and tower 4, instead of projecting over the stern of the vessel. The rails 12b in that case would run along the deck on opposite sides of the moonpool, rather than requiring outriggers to support them.

The hold-off clamp may comprise two clamp halves mounted on a carriage driven by a rack-and-pinion arrangement. The two halves may alternatively mounted on respective carriages movable independently of one another along the beam and operable to meet at any of said various positions.

Other physical arrangements and operating methods can readily, be envisaged by the skilled person, without departing from the spirit and scope of the invention.

The invention claimed is:

1. Apparatus for use in the laying of elongate articles from a vessel, which apparatus includes a tower, tensioning means supported on the tower for paying out the elongate articles under laying tension, and a hold-off clamp, wherein the hold-off clamp is mounted independently of the tower on a trolley which can be moved into and out of alignment with a laying axis of the tower while supporting the elongate article under laying tension, said tower being movable without movement of said hold-off clamp.

2. Apparatus as claimed in claim 1 wherein the trolley comprises at least one beam arranged to run on two rails and which spans the laying axis so as to move the hold-off clamp in a direction traverse to a length of said beam.

3. Apparatus as claimed in claim 2 wherein the vessel is provided with two outriggers which extend in parallel relationship and are spaced either side of the laying axis to define a working space between them, the trolley comprising the at least one beam which extends between the two rails, one rail provided along each of the two outriggers.

4. The apparatus as claimed in claim 2 wherein said hold-off clamp is mounted on said at least one beam via a carriage so as to be moveable in a direction parallel to the length of said at least one beam so that the hold-off clamp is moveable in two dimensions toward and away from the laying axis.

5. Apparatus as claimed in any one of preceding claims 1, 2 or 3 wherein the trolley is further provided with a platform or work area.

6. Apparatus as claimed in any one of preceding claims 1, 2 or 3 wherein the hold-off clamp is moveable in two dimensions toward and away from the laying axis.

7. Apparatus as claimed in claim 4 wherein the clamp is operable to at least one side of the lay axis and at least one of forward and aft of the lay axis.

8. Apparatus as claimed in any one of preceding claims 1, 2 or 3 wherein a radius controller is located at an upper end of the main tower for supporting one of the elongate articles being diverted into said tensioning means.

9. Apparatus as claimed in any one of preceding claims 1, 2 or 3 further comprising an abandonment and recovery (A&R) crane arranged for use in positioning of bulky loads within range of the hold off clamp.

10. A method of laying an elongate article from a vessel which includes a ramp or tower having a radius controller at its upper end and tensioning means on the ramp or tower for paying out said elongate article under tension, and a hold-off clamp mounted on a trolley at the foot of the ramp or tower for movement in and out of a laying axis of the ramp or tower, said tower being movable without movement of said hold-off clamp, the method including fitting a connection module to the elongate article being laid by:
   (a) positioning the hold-off clamp out of alignment with the laying axis of the ramp or tower;
   (b) locating and securing a connection in the hold-off clamp so that at least a connecting piece of the connection extends above the hold-off clamp;
   (c) positioning the hold-off clamp and the connection in line with the laying axis of the ramp or tower;
   (d) fixing the connection to the elongate article being laid; and
   (e) disengaging the hold-off clamp such that the weight of the connection module is supported by the elongate article.

11. A method of laying an elongate article from a vessel which includes a ramp or tower having a radius controller at its upper end, and tensioning means on the ramp or tower for paying out said elongate article under tension, and a hold-off clamp mounted on a trolley at the foot of the ramp or tower for movement in and out of a laying axis of the ramp or tower, said ramp or tower being movable without movement of said hold-off clamp, the method including fitting a connection to the elongate article being laid by:
   (a) positioning the hold-off clamp and securing it about the elongate article being laid, the elongate article ending (or being cut) at a position above the hold-off clamp so that the hold-off clamp supports a load of laid elongate article;
   (b) moving the hold-off clamp supporting the article out of alignment with the laying axis of the ramp or tower;
   (c) positioning a connection module above the hold-off clamp;
   (d) fixing the connection module to an end of the elongate article; and
   (e) supporting the load of laid elongate articles and disengaging the hold-off clamp.

12. A method as claimed in claim 11 wherein the connection fitted to the elongate article is a tail end fitting and the method includes the further step of deploying the end of the elongate article to the seabed.

13. A method as claimed in claim 11 wherein the connection fitted to the elongate article is a mid-line connection and the method includes the further steps of:
   (f) positioning the connection module in the hold-off clamp so that at least a connecting piece extends above the hold-off clamp;
   (g) moving the hold-off clamp under the ramp or tower so that it is in line with the laying axis of the ramp or tower;
   (h) fixing the connecting piece to the elongate article suspended in the ramp or tower; and
   (i) disengaging the hold-off clamp while paying out the elongate article via said tensioning means.

* * * * *